United States Patent [19]

Ealding et al.

[11] B 3,997,701
[45] Dec. 14, 1976

[54] COATED POLYESTER FILMS

[75] Inventors: Cyril John Ealding, Puckeridge; Gordon Edmund Alfred Pears, Harpenden, both of England

[73] Assignee: Imperial Chemical Industries Limited, London, England

[22] Filed: Mar. 11, 1974

[21] Appl. No.: 450,196

[44] Published under the second Trial Voluntary Protest Program on February 10, 1976 as document No. B 450,196.

[30] Foreign Application Priority Data

Apr. 2, 1973 United Kingdom ............ 15704/73
July 16, 1973 United Kingdom ............ 33715/73

[52] U.S. Cl. .................................. 428/341; 96/75; 96/87 A; 252/511; 252/518; 427/211; 427/171; 428/483
[51] Int. Cl.² .................. B32B 27/06; B32B 27/36
[58] Field of Search .......... 117/7, 138.8 F, 161 LN, 117/161 UB, 161 UC:224; 96/87 A, 114.2, 75; 252/518, 511; 427/211, 171; 428/341, 483

[56] References Cited

UNITED STATES PATENTS

| | | | |
|---|---|---|---|
| 3,437,484 | 4/1969 | Nadeau | 117/138.8 X |
| 3,598,641 | 8/1971 | Miller et al. | 117/138.8 E |
| 3,819,773 | 6/1974 | Pears | 264/37 |

*Primary Examiner*—Michael R. Lusignan
*Attorney, Agent, or Firm*—Cushman, Darby & Cushman

[57] ABSTRACT

Antistatic polyester films suitable for montage printing processes are made by coating the polyester film during or after orientation with an antistatic composition comprising lithium nitrate and polymeric binder, such as an acrylic copolymer.

4 Claims, No Drawings

COATED POLYESTER FILMS

This invention relates to coated films of synthetic linear polyesters, and particularly to films provided with antistatic coatings.

According to the present invention a process for the production of an antistatic polyester film, comprises coating the film with an antistatic composition comprising lithium nitrate, and an aqueous dispersion of an acrylic or methacrylic polymer or copolymer binder with a non-ionic emulsifying agent. The invention is also concerned with an antistatic film coated with an antistatic layer comprising lithium nitrate and an acrylic or methacrylic polymer or copolymer.

According to one embodiment of the invention the process comprises melt extruding a linear polyester film, quenching it into the amorphous state and thereafter biaxially orienting the film by stretching in mutually perpendicular directions, the antistatic composition being applied to the film surface before the stretching operation is completed. In an alternative embodiment the antistatic composition is applied to the film after stretching has been completed. The invention is also concerned with antistatic films made by the process described herein.

The polyester film may be made from any thermoplastic film forming polyester which may be produced by condensing a dicarboxylic acid or a lower alkyl diester thereof with a glycol. Such polyesters may be produced by condensing one or more dicarboxylic acids or their lower alkyl diesters, e.g. terephthalic acid; isophthalic; phthalic; 2,5, 2,6, or 2,7-naphthalene dicarboxylic acid; succinic acid; sebacic acid; adipic acid; azelaic acid; bibenzoic acid; and hexahydroterephthalic acid; or bis-p-carboxy phenoxy ethane, with one or more glycols, e.g. ethylene glycol; 1,3-propanediol; 1,4-butanediol; neopentyl glycol and 1,4-cyclohexanedimethanol. It is to be understood that the polyester film may consist of a copolyester of any of the above materials. The preferred polyester film is polyethylene terephthalate film.

The lithium nitrate of the antistatic composition is present to provide the desired antistatic properties. Surprisingly it has been found that when lithium nitrate alone is applied to a linear polyester film and the application is followed by all or the completion of the stretching steps employed to develop orientation in the film the antistatic properties of the stretched film are very poor and the coating is hazy. However, when the lithium nitrate is applied in a composition which includes the specified binder, which anchors the lithium nitrate to the film surface and makes the coating resistant to abrasion, it has been found that satisfactory antistatic properties can be developed and the coating is clear.

The coating may be applied to one or both sides of the film.

A coat weight of about 100 or more than 100 $\mu g/dm^2$ of the lithium nitrate component on one or each side of the finished film has been found to produce satisfactory antistatic properties. The actual proportion of lithium nitrate in a practical coating composition which is required to achieve this or more than this coat weight of lithium nitrate depends on the nature of the coating technique adopted and the stage of coating in the film making process, e.g. whether the film is to be stretched after coating or not.

The lithium nitrate is applied from an aqueous medium in which the acrylic or methacrylic polymer or copolymer is dispersed by the emulsifying agent.

Cross-linkable acrylic polymers or copolymers are suitable for use as the polymeric binder. The cross-linkable acrylic or methacrylic polymers or copolymers may be formed from acrylic or methacrylic acid or their esters containing functional groups, such as hydroxy, carboxyl, amide and oxirane groups. A non-ionic emulsifying agent such as nonyl phenol condensed with ethylene oxide is suitable for use with such binders.

Preferably the cross-linkable acrylic or methacrylic binder also includes a condensation product of an amine, such as melamine, urea and diazines or their derivatives, with formaldehyde, which may be alkylated. A suitable binder is based on an ethyl acrylate/methyl methacrylate/methacrylamide copolymer and an ethylated amine/formaldehyde condensate. Desirably a cross-linking catalyst, e.g. ammonium chloride is provided to cross-link the acrylic or methacrylic binder. Such binders are particularly preferred as the coated films can be recycled with fresh polymer through the film making process without appreciably reducing the overall properties of the resultant film.

The coating composition which is applied to the film may also include antioxidants, dyes, pigments, lubricants, anti-blocking agents and/or slip agents, i.e. comminuted solids which are insoluble in the coating, e.g. starch, talc, zinc oxide, calcium carbonate, silica, titanium dioxide, triferric tetroxide, silicates, aluminates, alumino silicates and discrete particles of polymeric materials such as polyvinyl chloride or polymethyl methacrylate.

Antistatic properties represented by a surface resistivity of less than about $10^{12}$ ohms/square at a relative humidity of about 50% give freedom from the deposition of atmospheric dust upon the film surface. To achieve this level of surface resistivity a coat weight or surface concentration of at least 100 $\mu g/dm^2$ of lithium nitrate on one or each side of the finished film is required and generally we prefer to use an actual surface concentration in the region of 100 $\mu g/dm^2$ because although the surface resistivity is lowered even further at higher surface concentrations of lithium nitrate, there is no marked improvement in the prevention of dust accumulation on the surface of the film and the surface moisture of the film increases and the clarity of the film becomes poorer. The values for the surface concentration of lithium nitrate specified herein are determined by a technique of aqueous extraction of the coating and measuring the amount of lithium in the extracted solution.

The coat weight or surface concentration of the binder is preferably about 1.7 times that of the lithium nitrate but may vary from this value although at significantly higher and lower coat weights coating imperfections become visible.

Our preferred polyester is polyethylene terephthalate and films of this are oriented (as is well known) by stretching them at a temperature within the range of from 78° to 125°C.

Various known types of apparatus which are designed to stretch continuous lengths of film in the machine and transverse directions are suitable for use in the stretching processes of this invention. The film may be stretched in either order, that is stretching first in either the longitudinal or transverse direction followed by stretching in the other direction, or in both directions simultaneously. For example, the film may conveniently be stretched in the machine direction by passing it between or around a pair or a series of slow rollers which may be heated to the desired temperature and then between or around a pair or a series of fast rollers. A useful alternative method of heating the film is by means of radiant heat, applied to a small length of film between the fast and slow rollers. The film may be stretched in the transverse direction in a stenter apparatus. For stretching in a stenter, oven heating is preferred. We prefer to carry out the longitudinal stretching at a temperature of from 78° to 100°C and the transverse stretching at a temperature of from 80° to 125°C, preferably 100°C to 125°C. The film may be stretched at any draw ratio commonly employed in the production of polyester film, generally up to about 4.5 times in each direction. Convenient draw ratios are about 3.5 times in each direction.

The biaxially oriented film may conveniently be heat set at a temperature ranging from 150° to 240°C, preferably 195° to 215°C.

According to this invention the antistatic composition may be applied to the film before the stretching operation is completed, e.g. to the amorphous film, i.e. before the commencement of any stretching. Thus the coating composition may be applied to the amorphous film following extrusion and quenching and before the first stretching operation. Alternatively the antistatic composition may be applied to the film after it has been stretched in one direction and before stretching in the second direction. Since most commercially available biaxially oriented polyester films are made by a process which involves stretching firstly in the longitudinal direction and then in the transverse direction which is followed by heat setting, the antistatic composition is conveniently applied to the film surface during such a process at a stage after the film has been stretched longitudinally but before it is stretched transversely. Some biaxially oriented films are stretched first in the transverse direction and the coating process of this invention may be employed to coat such films before the commencement of stretching or after transverse stretching.

Alternatively the antistatic composition may be applied to the film surface after stretching and heat setting have been completed.

The antistatic properties of many common antistatic agents are deactivated when the agents are subjected to the stretching and heat setting process used for the production of polyester films. Surprisingly the antistatic qualities obtainable according to this invention are not destroyed under such conditions but are best achieved with heat setting temperatures below 220°C.

After the antistatic composition has been applied to the film surface the medium from which it is applied should normally be removed by drying and this can conveniently be carried out in an air oven maintained at a temperature of around 80° to 125°C or by radiant heat. In processes in which the film is transversely stretched in a stenter machine, heating or stretching is generally effected in a hot air oven and therefore drying can be carried out during transverse stretching.

Coating may be effected by any of the techniques known in the art, e.g. roller coating, slot coating and doctor blade coating.

The coated films provided by this invention have excellent antistatic properties.

The coated film also has excellent clarity and good slip properties.

The antistatic films of this invention are particularly suitable for use in printing processes involving montage techniques in which it is important to avoid build up of dust particles upon the film surface employed. The antistatic films also exhibit good adhesion to conventional adhesives used in montage assembly, printing inks, light sensitive diazo type materials and matt lacquers. Montage adhesives may be cleaned from the surface using chlorinated hydrocarbons e.g. carbon tetrachloride or 1,1,1-trichloroethane with no significant loss of antistatic effect.

The invention is illustrated by the following examples:

EXAMPLE 1

A polyethylene terephthalate film was melt extruded and rapidly quenched to the amorphous state on a cooled rotating casting drum. The cast film was stretched about 3.5 times its original dimensions in the direction of extrusion at about 85°C and was then coated by a roller coating technique on both sides with an aqueous dispersion having the following composition, parts being expressed by weight:

| | | |
|---|---|---|
| Cross-linkable acrylic binder comprising 87% by weight of copolymer of ethyl acrylate, methyl methacrylate and methacrylamide (45%, 50% and 5% by weight), and 13% by weight of ethylated melamine formaldehyde | 4.5 | parts |
| Lithium nitrate | 3.0 | parts |
| Nonyl phenol condensed with average of 8 moles ethylene oxide emulsifying agent | 0.15 | part |
| Distilled water | 92.0 | parts |

The coated film was stretched in the transverse direction about 3.5 times its original dimensions at about 110°C and then heat set at 200°C.

The finished film had a total dry coat per side weight of 250 $\mu g/dm^2$ (i.e. lithium nitrate plus binder) and a surface resistivity of about $3 \times 10^{11}$ ohms/square at a relative humidity of about 50%. The coefficient of static friction of the coated film was about 0.7. The film was resistant to the accumulation of dust on its surface and showed good adhesion to other coatings such as printing inks and diazo type materials.

The antistatic coated film was capable of re-extrusion with fresh polyethylene terephthalate to produce a film containing about 10% by weight of recycled coated film with no substantial deterioration of film properties except a slight yellowing.

EXAMPLE 2

A conventional biaxially oriented and heat set film of polyethylene terephthalate was coated on both sides with an aqueous antistatic dispersion having the composition given in Example 1 to give a final coat weight on each side of 110 $\mu g/dm^2$ of lithium nitrate. The finished film had a surface resistivity of about $10^{10}$ ohms/square at a relative humidity of 50% and was resistant to the accumulation of dust particles on its surface. The coefficient of static friction of the coated film was about 0.7. The film showed good adhesion to overcoatings, e.g. printing inks and diazo type materials and was capable of being recycled as indicated in Example 1 without appreciably affecting the overall properties of the resultant film apart from a slight visual yellowing.

EXAMPLE 3

Example 1 was repeated using an aqueous dispersion coating composition, as follows, parts being expressed by weight:

| | |
|---|---|
| Cross-linkable acrylic binder comprising 87% by weight of copolymer of ethyl acrylate, methyl methacrylate and methacrylamide (45%, 50% and 5% by weight), and 13% by weight of ethylated melamine formaldehyde | 5.4 parts |
| Lithium nitrate | 3.2 parts |
| Nonyl phenol condensed with average of 8 moles ethylene oxide emulsifying agent | 0.15 part |
| Distilled water | 91.0 parts |

The film obtained had a total dry coat weight per side of 250 $\mu g/dm^2$ (representing lithium nitrate plus binder) and had substantially the same properties as the film described in Example 1.

We claim:

1. An antistatic polyester film coated on one side with an antistatic layer comprising lithium nitrate and an acrylic or methacrylic polymer or copolymer binder wherein the coat weight of lithium nitrate is at least 100 $\mu g/dm^2$.

2. An antistatic polyester film according to claim 1, in which the coat weight of the binder is about 1.7 times that of the lithium nitrate.

3. An antistatic polyester film coated on each side with an antistatic layer comprising lithium nitrate and an acrylic or methacrylic polymer or copolymer binder wherein the coat weight of lithium nitrate on each side of the film is at least 100 $\mu g/dm^2$.

4. An antistatic polyester film according to claim 3 in which the coat weight of the binder is about 1.7 times that of the lithium nitrate.

* * * * *